United States Patent [19]

Ohmae

[11] Patent Number: 5,237,698
[45] Date of Patent: Aug. 17, 1993

[54] MICROCOMPUTER
[75] Inventor: Hideo Ohmae, Kobe, Japan
[73] Assignee: Rohm Co., Ltd., Kyoto, Japan
[21] Appl. No.: 802,041
[22] Filed: Dec. 3, 1991
[51] Int. Cl.⁵ ............................. G06F 1/24; G06F 1/26
[52] U.S. Cl. .................................... 395/750; 364/707;
364/DIG. 1; 364/273.1; 364/273.3
[58] Field of Search ............... 395/750; 364/707;
371/66

[56] References Cited
U.S. PATENT DOCUMENTS

| | | | |
|---|---|---|---|
| 4,317,180 | 2/1982 | Lies | 364/707 |
| 4,551,841 | 11/1985 | Fujita et al. | 395/750 |
| 4,766,567 | 8/1988 | Kato | 371/66 |
| 4,788,661 | 11/1988 | Morita | 395/750 |
| 4,992,951 | 2/1991 | Glowczewski et al. | 395/750 |

Primary Examiner—Debra A. Chun
Attorney, Agent, or Firm—Fay, Sharpe, Beall, Fagan, Minnich & McKee

[57] ABSTRACT

A microcomputer that comprises a standby signal generating circuit for supplying a standby signal to a processor and an initial reset circuit for supplying an initial reset signal to the processor when supply voltage becomes lower than a predetermined value, wherein the standby signal is produced in either case where a standby condition is sustained or imposed to switch the processor from an operation mode to a standby mode so that the supply voltage may be lowered during the standby mode, is characterized by the provision of a blocking circuit for blocking the entrance of the initial reset signal into the processor according to the standby signal thus produced.

19 Claims, 1 Drawing Sheet ced control are maintained even in the standby mode. Moreover, a built-in clock keeps counting the time so that each point of time may be indicated. Under the control of this kind, the data stored in the program counter, the registers and the memory contained in the microcomputer are kept intact during the standby mode and a specific operation is kept on as occasion demands.

Moreover, the information given by pressing a specific key one time earlier is stored in the program counter and the registers of a remote controller and held even in the standby mode that follows. When the key is pressed subsequently to restore the operation mode, the information stored immediately prior to the mode standby causes control to be exerted again from the state prior to the standby mode.

Although supply voltage in the operation mode is normally about 5 V, the supply voltage itself is reduced to about 3 V in the standby mode and the operation of each circuit is also set to a halt condition. It is thus attempted to economize the power consumption during the mode standby further. If, however, the battery of a microcomputer designed to reduce the supply voltage to a desired standby level, 3 V for instance, is replaced during the standby mode, initial resetting may be performed as the supply voltage lowers to an initial reset voltage because of insufficient power backup. Moreover, there is also fear that the initial resetting will be performed when the supply voltage lowers during the standby mode as the battery power consumption increases and this arises as long as an initial reset circuit operating upon detection of the supply voltage is employed. When the initial resetting is performed, the data held in the register and the program counter are lost.

MICROCOMPUTER

BACKGROUND OF THE INVENTION

1. Technical Field

The present invention relates generally to microcomputers and more particularly to a battery-driven microcomputer having a standby mode in which initial resetting is prevented from being inadvertently performed and thereby rendering power consumption reducible.

2. Background Art

One-chip microcomputers are widely used as control circuits in cameras, home electric appliances and other kinds of electronic equipment, as remote controllers and the like. These are generally 4- or 8-bit microcomputers.

One-chip microcomputers of this sort are different from general purpose microprocessors in that one chip incorporates a number of elements such as a register, a memory, ALU and the like that are connected to a common bus. While controlling circuits including an I/O buffer, RAM, a register, ALU and the like, the controller such as a built-in CPU exchanges data with an external circuit via the I/O buffer.

Most of the one-chip microcomputers (one-chip microprocessors) are battery-driven and provided with a standby mode to economize battery power consumption. Each circuit of a one-chip microcomputer is usually set on standby mode and an operation mode is reset in response to keyboard entry and other mechanical operations. Some of the one-chip microcomputers are so controlled as to preserve data in the operating mode immediately preceding the standby mode or at a point of standby time and to restart operations in the state immediately preceding the standby mode or a designated state when the operation mode is followed. Various home electric and electronic appliances set to operate by means of time switches, for instance, have built-in one-chip microcomputers which function as those causing prescribed control to be exerted at a preset time and the time to be displayed simultaneously. Under that control, time data and what is used for exerting desired

SUMMARY OF THE INVENTION

In order to avoid the loss of data, response to supply voltage reduction in the standby mode will be restricted to a certain extent.

A microcomputer embodying the present invention comprising a standby signal generating circuit for supplying a standby signal to a processor and an initial reset circuit for supplying an initial reset signal to the processor when supply voltage becomes lower than a predetermined value, wherein the standby signal switches the processor from an operation mode to a standby mode so that the supply voltage may be reduced during the standby mode, is characterized by a blocking circuit for preventing supply of the initial reset signal to the processor according to the standby signal.

The supply voltage in the standby mode is thus made sufficiently reducible without data loss by blocking the supply of the initial reset signal to the processor according to the standby signal. As a result, the initial reset signal that has been produced thereby is prevented from being supplied to the processor even though the initial reset circuit operates in an initial reset state resulting from the sagging of the supply voltage when the battery is replaced. The data stored in the register and the memory of the processor in the standby mode can be preserved accordingly. Provided there exists an external circuit that can be initial reset, its data is also preserved, and the processor resetting to the operating mode later is capable of restarting the operation according to the data.

Consequently, it is possible to enter the standby mode with low power consumption as there is no risk of losing data.

An object of the present invention is therefore to solve the foregoing problems in the prior art by providing a microcomputer free from the risk of data loss in allowing initial resetting in a standby mode.

Another object of the present invention is to provide a microcomputer capable of readily reducing supply voltage in a standby mode and preventing preserved data from being initial reset then.

Still another object of the present invention is to provide a battery-driven, low power consumption type microcomputer.

DESCRIPTION OF THE PREFERRED EMBODIMENT

Figure 1:
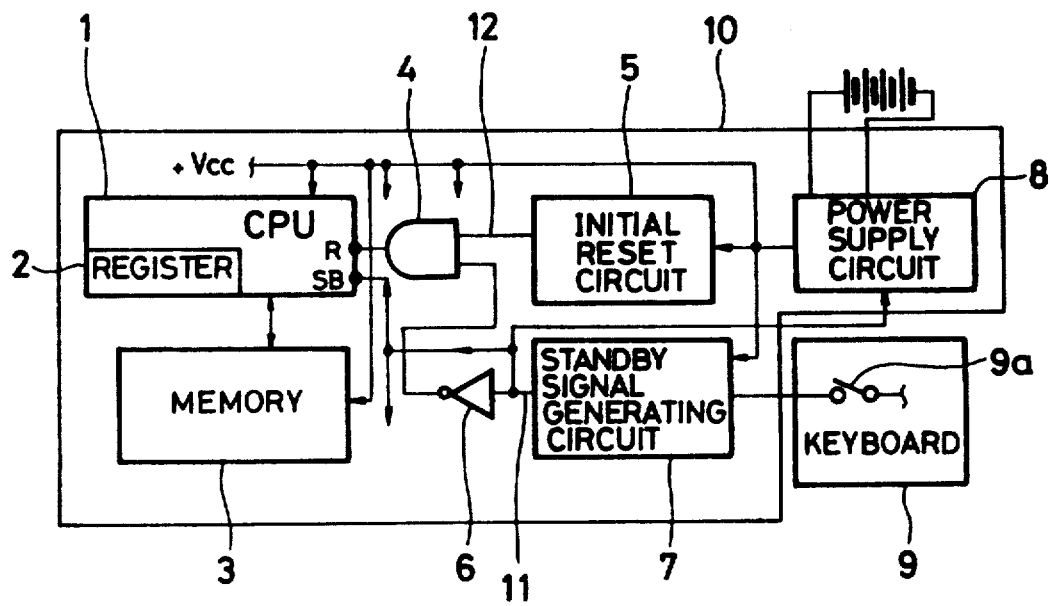
FIG. 1 is a block diagram of a one-chip microcomputer embodying the present invention.

FIG. 1 illustrates a one-chip microcomputer 10 comprising CPU 1 incorporating a register 2 such as a program counter, a memory 3, a two-input AND gate 4, an initial reset circuit 5, an invertor 6, a standby signal generating circuit 7, and a power supply circuit 8. With this arrangement, an operation mode is switched over to a standby mode and vice versa simultaneously with the generation and suspension of a standby signal 11 from the standby signal generation circuit 7.

The standby signal generating circuit 7 produces a high level ("H") standby signal 11, which is supplied to CPU 1 in the standby mode. The standby signal generating circuit 7 also supplies the standby signal 11 as it is to the power supply circuit 8 and the other circuits that are set to a standby mode. On receiving the standby signal 11 ("H") at its standby terminal (SB), CPU 1 enters the standby mode and simultaneously switches an external circuit such as the memory 3 and the self-contained register 2 from an operating mode to the standby mode, the external circuit being such that its operating and standby modes are controlled by CPU 1. CPU 1 further produces a signal for suspending the operation of each circuit in the one-chip microcomputer 10 in the standby mode. On receiving the standby signal 11, the power supply circuit 8 switches its output supply voltage from DC 5 V to DC 3 V, for instance.

When a key 9a on a keyboard 9 is pressed, the standby signal generating circuit 7 receives a pressed-key signal from the keyboard 9 and switches the standby signal 11 from "H" to LOW level ("L") so as to suspend the generation of the standby signal 11. Then CPU 1 and the circuits are reset to the operating mode and the power supply circuit 8 simultaneously switches its output voltage from DC 3 V to DC 5 V. The switchover of the supply voltage of the power supply circuit 8 may be conducted in such a way that the power supply circuit 8 responds to the external output produced by CPU 1 that has received the change of standby signal ("H") to ("L") for suspending the standby signal 11.

The initial reset circuit 5 is used to monitor voltage of a power supply line +Vcc connected to the output of the power supply circuit 8. When that voltage is found to be 2 V or lower, for instance, the initial reset circuit 5 supplies an initial reset signal 12 via the initial AND gate 4 to the reset terminal (R) of CPU 1. On receiving the initial reset signal 12, CPU 1 initializes the self-contained register 2 and the memory 3 as an external circuit whose standby mode is controlled by CPU 1. When power supply line voltage +Vcc is reduced from 3 V to 2 V for reasons attributable to battery replacement and battery consumption and the like during the standby mode, the initial reset signal 12 is produced.

The initial reset signal 12 is applied to one of the inputs of the AND gate 4 and to CPU 1 via the AND gate 4. The AND gate 4 and the invertor 6 constitute a blocking circuit for blocking the initial reset signal 12 in the standby mode. More specifically, the inverted signal ("L") of the "H" standby signal 11 is received by the other input of the AND gate 4 from the standby signal generating circuit 7 via the invertor 6 during the standby mode. The AND gate 14 is therefore closed in the standby mode. Even if the initial reset signal 12 is produced during the standby mode, it will never be applied to CPU 1. In the standby mode, CPU 1 is prevented from initial being reset even though the power supply line voltage +Vcc decreases to 2 V or lower, thus causing even the initial reset operating voltage to lower. The data stored in the register 2 and the memory 3 are not lost in the standby mode.

The minimum voltage required for memories and registers to hold data is normally about 1.2 V. For this reason, a backup capacitor, for instance, is used to generate a higher voltage to be applied to the register and the memory when the battery is replaced. While the battery remains detached, it has been arranged that power is supplied to various circuits such as the register and the memory for a certain time. This capacitor is not illustrated as it is generally known, though it forms part of the power supply circuit 8.

In the circuits described above, even if the power supply line voltage drops to 2 V or lower because it takes time to replace the battery, the initial reset signal 12 produced thereby is blocked by the AND gate 4 during the standby mode. In other words, the data held in each circuit remains valid unless the power supply line voltage drops to the minimum data holding voltage for the memory and the like, e.g. to 1.2 V or lower. The battery-driven microcomputer allows for a time margin at the time the battery is replaced.

When the microcomputer 10, if it is battery-driven, is in the operation mode, no initial resetting is performed in that mode as the power supply line voltage +Vcc cannot be reduced to 2 V or lower. When the initial resetting is needed, a reset switch for ordinary initial resetting should be turned "ON" or the application of the supply voltage itself should be suspended by turning a power supply switch "OFF." The battery should otherwise be removed if neither of those switches is installed. As the supply voltage is not being generated, the circuits may be started with the following "ON" state of the power supply so as to enter the operating state and the initial resetting of each circuit is performed then.

No standby signal 11 ("H") is produced as the standby signal generating circuit 7 is not in the operating state immediately after the battery is reloaded (this battery replacement is hereinafter assumed to include the "ON" state of the power supply) or at a point of time the power supply is turned "ON" by pressing a power supply switch or a standby switch used both as a power supply switch and a standby switch, if any. At this time, the output of the invertor 6 becomes "H." As the supply voltage increases after the power supply is turned "ON" while the AND gate 4 is kept open, the initial reset circuit 5 operates to cause the initial reset signal 12 to be produced and this signal is applied to CPU 1. As a result, each built-in circuit including the standby signal generating circuit 7 as occasion demands may be reset during the initial reset period at the point of time the power supply is turned "ON." The standby signal 11 should be prevented from attaining "H" in the "ON" state of the power supply for a prescribed period of time in consideration of an exceptional case where the standby signal generating circuit 7 operates by mischance simultaneously when the power supply is turned "ON."

Figure 2:
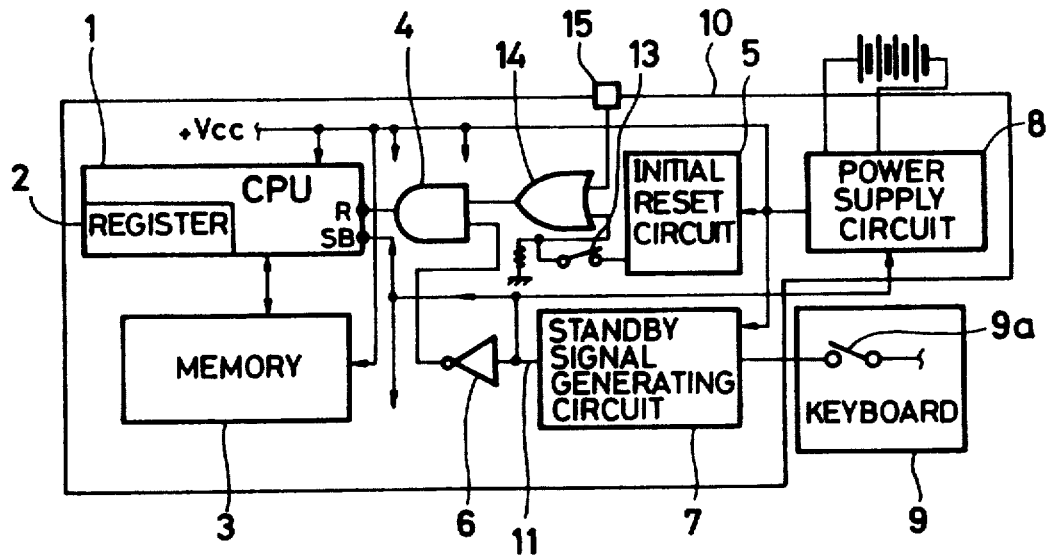
FIG. 2 is a block diagram of another one-chip microcomputer embodying the present invention.

FIG. 2 illustrates an embodiment wherein an external/internal selective circuit comprises a selective connection circuit 13 and an OR gate 14. With this arrangement, it is possible to choose between cases where a reset signal is supplied from the outside to the external reset terminal and where the built-in initial reset circuit 5 is employed. In other words, the output of the initial reset circuit 5 is supplied via the selective connection circuit 13 to one of the inputs of the two-input OR gate 14, whereas the output of the OR gate 14 is applied to the AND gate 4. The other input of the OR gate 14 is connected to reset terminal 15 as one of the chip external terminals. Therefore, the reset signal can be received from the outside via the terminal 15.

In this case, the selective connection circuit 13 is formed in the same layer that ROM data is written to and by making it choosable whether or not their terminals are connected simultaneously when the data is written thereto, either the connected or the non-connected state of the selective connection circuit 13 is made readily choosable by selecting a mask at the time of writing the ROM data during the process of manufacture. The one-chip microcomputer using the built-in initial reset circuit 5 or using the external reset terminal 15 can thus be set selectively when the ROM data is written. Consequently, the one-chip microcomputer 10 need not be constructed through different process steps.

Incidentally, the standby signal 11 is rendered significant when it is at "H" in the embodiment shown and it is produced during the standby state. Moreover, the "H" voltage level of the standby signal itself lowers in the standby mode. When the voltage reduction affects the "H" voltage of the standby signal, a standby-signal rising or falling edge standby mode may be followed, whereby the standby mode can be followed at the establishment of the standby condition. If the standby signal is rendered significant when it is at "L," on the other hand, the invertor 8 can be dispensed with. The standby signal 11 may attain "L" in the operating state, immediately after the battery is reloaded or at a point of time the power supply is turned "ON" by pressing a power supply switch or a standby switch used both as a power supply switch and a standby switch, if any. Therefore, it is only necessary to provide a circuit for setting the standby signal 11 at "H." The supply voltage to be reduced in response to the generation of the standby signal is needless to say what is higher than the minimum voltage at which the data stored in the register and the memory are not lost.

As set forth above, the initial reset circuit 5 in the embodiment may be provided outside the one-chip microcomputer.

Although a description has been given of a case where the standby mode is followed while the key 9a on the keyboard 9 remains unpressed (in the "OFF" state, so to speak), the standby signal should be produced from the standby signal generating circuit when a standby state setting key, the standby switch, the power supply switch or the like for use then is turned "ON" or "OFF." Although the standby signal is to be supplied to the standby terminal of the CPU, it may be applied to a sleeve terminal for setting the CPU to the halt condition.

Battery-driven examples have been described in the embodiments shown. However, the present invention is applicable to any microcomputer other than what is battery-driven as long as it is of a low power consumption type which allows initial setting to be performed as the power supply line voltage lowers in the standby mode.

While a preferred embodiment has been set forth along with modifications and variations to show specific advantageous details of the present invention, further embodiments, modifications and variations are contemplated within the broader aspects of the present invention, all as set forth by the spirit and scope of the following claims.

What is claimed is:

1. A microcomputer comprising:
    a volatile memory;
    a processor operable selectively in an operation mode and a standby mode in accordance with a standby signal;
    a standby signal generating circuit for supplying the standby signal to said processor in response to a standby condition;
    an initial reset circuit for supplying an initial reset signal to said processor when a supply voltage becomes lower than an initial reset value;
    a power supply circuit for reducing the supply voltage in response to the standby signal to a value of voltage higher than a minimum voltage for said volatile memory to hold data in said volatile memory in the standby mode; and
    a blocking circuit receiving the standby signal and the initial reset signal for preventing supply of the initial reset signal to said processor when the standby signal indicates the standby mode.

2. A microcomputer as claimed in claim 1, wherein said power supply circuit includes a capacitor for generating backup power to supply the minimum voltage for keeping the data in said register in the standby mode.

3. A microcomputer as claimed in claim 2, wherein said blocking circuit has an AND gate receiving inputs of the standby signal and the initial reset signal for outputting said initial reset signal when said standby signal received does not indicate the standby mode; and
    wherein said standby signal generating circuit produces the standby signal in response to receiving power from the power supply circuit and in response to the standby condition.

4. A microcomputer as claimed in claim 3, wherein said blocking circuit includes an inverter for inverting the standby signal and supplying an inverted standby signal to said AND gate.

5. A microcomputer as claimed in claim 1, wherein said power supply includes a battery.

6. A one chip microcomputer having selective standby and operation modes, comprising:
    a CPU having a reset input and a standby input, and further having a power supply input;
    a volatile memory having a power supply input;
    a power supply circuit for providing a power supply output including normal operating voltage to said power supply inputs and providing a standby voltage substantially less than said normal operating voltage to said power supply inputs in response to a standby signal;
    a standby signal generating circuit responsive to a standby condition for generating the standby signal and outputting the standby signal to said power supply circuit and said standby input of said CPU;
    said volatile memory means having a minimum voltage for the volatile memory power supply input that is effective to reliably hold data, which minimum voltage is substantially less than the standby voltage;
    an initial reset circuit responsive to a reset condition, including a voltage provided by said power supply circuit dropping below an initial reset voltage, for producing an initial reset signal; and
    means for transmitting the initial reset signal from said initial reset circuit to said reset input of said CPU in response to the absence of said standby signal, and for preventing the transmission of the initial reset signal to said reset input of said CPU when the standby signal indicates the standby mode.

7. The microcomputer as claimed in claim 6, wherein said means includes an AND circuit having inputs receiving the initial reset signal and the standby signal.

8. The microcomputer as claimed in claim 7, wherein said means further includes an inverter for inverting the standby signal between the standby signal generating circuit and said AND circuit.

9. The one chip microcomputer of claim 7, further including an external terminal for receiving an external initial reset signal; and
   an OR circuit having inputs of the external initial reset signal and the initial reset signal from said initial reset circuit and further having an output connected as one of the inputs of said AND circuit.

10. The one chip microcomputer of claim 9, further including switch means between said OR circuit and said initial reset circuit for selectively supplying or preventing the supplying of the initial reset signal from said initial reset circuit to said OR circuit and thereby ultimately to said AND circuit.

11. A microcomputer system, including the one chip microcomputer of claim 6, and further including:
   an input device for providing an input signal to the one chip microcomputer, and
   wherein said one chip microcomputer has an input terminal connected to said standby signal generating circuit for receiving the input signal from said input device as a standby condition to switch from the standby mode to the operation mode in response to input from the input device.

12. A microcomputer system, including the one chip microcomputer of claim 6, and further comprising:
   a battery power supply;
   wherein said one chip microcomputer has power supply input terminals connected to said battery power supply and providing power to said power supply circuit so that the power supply output by said power supply circuit is reduced in voltage to provide the reset condition when said battery power supply is disconnected from said one chip microcomputer.

13. A one chip microcomputer according to claim 6, wherein said volatile memory further includes a volatile data storage memory in addition to said register, having a power supply input connected to receive the power supply output from said power supply circuit and having the minimum voltage for holding data.

14. The one chip microcomputer of claim 6, wherein said volatile memory includes a program counter.

15. The microcomputer as claimed in claim 14, wherein said means includes an AND circuit having inputs receiving the initial reset signal and the standby signal.

16. The one chip microcomputer of claim 15, further including an external terminal for receiving an external initial reset signal; and
   an OR circuit having inputs of the external initial reset signal and the initial reset signal from said initial reset circuit and further having an output connected as one of the inputs of said AND circuit.

17. The one chip microcomputer of claim 16, further including switch means between said OR circuit and said initial reset circuit for selectively supplying or preventing the supplying of the initial reset signal from said initial reset circuit to said OR circuit and thereby ultimately to said AND circuit.

18. A microcomputer system, including the one chip microcomputer of claim 17, and further including:
   an input device for providing an input signal to the one chip microcomputer, and
   wherein said one chip microcomputer has an input terminal connected to said standby signal generating circuit for receiving the input signal from said input device as a standby condition to switch from the standby mode to the operation mode in response to input from the input device.

19. A microcomputer system, including the one chip microcomputer of claim 18, and further comprising:
   a battery power supply;
   wherein said one chip microcomputer has power supply input terminals connected to said battery power supply and providing power to said power supply circuit so that the power supply output by said power supply circuit is reduced in voltage to provide the reset condition when said battery power supply is disconnected from said one chip microcomputer.

* * * * *